(12) United States Patent
Bolis

(10) Patent No.: US 12,541,586 B2
(45) Date of Patent: Feb. 3, 2026

(54) VIRTUAL MACHINE BOUND SCHEDULING OF TRUSTED EXECUTION ENVIRONMENT ENTITIES

(71) Applicant: QUALCOMM Incorporated, San Diego, CA (US)

(72) Inventor: Christian Bolis, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 124 days.

(21) Appl. No.: 18/510,564

(22) Filed: Nov. 15, 2023

(65) Prior Publication Data

US 2025/0156528 A1 May 15, 2025

(51) Int. Cl.
- *G06F 21/53* (2013.01)
- *G06F 9/455* (2018.01)
- *G06F 21/54* (2013.01)

(52) U.S. Cl.
CPC .......... *G06F 21/53* (2013.01); *G06F 9/45558* (2013.01); *G06F 21/54* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 2014/0095918 A1* | 4/2014 | Stahl | ..................... | G06F 21/725 713/500 |
| 2014/0317686 A1* | 10/2014 | Vetillard | ................. | G06F 21/74 726/2 |
| 2021/0374253 A1* | 12/2021 | Chen | ..................... | H04L 9/0897 |
| 2024/0311171 A1* | 9/2024 | Van Schaik | ............. | G06F 21/53 |

FOREIGN PATENT DOCUMENTS

JP     2012146204 A  *  8/2012

OTHER PUBLICATIONS

Chen H., et al., "A Fast RPC System for Virtual Machines", IEEE Transactions on Parallel and Distributed Systems, IEEE, USA, vol. 24, No. 7, Jul. 1, 2013, pp. 1267-1276, XP011511148, p. 1268-p. 1271.
International Search Report and Written Opinion—PCT/US2024/054925—ISA/EPO—Feb. 17, 2025.

(Continued)

*Primary Examiner* — Scott B Christensen
(74) *Attorney, Agent, or Firm* — Polsinelli

(57) ABSTRACT

Systems and techniques are provided for accessing execution environments. For instance, a process can include calling, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receiving, by the second object, a call from the first object; switching the scheduling context to the scheduling context of the second VM based on the received call from the first object; and executing code associated with the second object in the scheduling context of the second VM.

28 Claims, 8 Drawing Sheets

(56) References Cited

OTHER PUBLICATIONS

Wang J., et al., "XenLoop: A Transparent High Performance Inter-VM Network Loopback", Proceedings of the 17th International Symposium on High Performance Distributed Computing, HPDC '08, ACM Press, New York, USA, Jun. 23, 2008, pp. 109-118, XP058345182, p. 111-p. 113.

Xu X., et al., "virtCCA: Virtualized Arm Confidential Compute Architecture with TrustZone", arxiv.org, Cornell University Library, 201 OLIN Library Cornell University Ithaca, NY 14853, arXiv: 2306.11011v1 [cs.CR], Jun. 19, 2023, pp. 1-17, XP091542860, p. 3-p. 9.

\* cited by examiner

600

Call, By A First Object, A Second Object, Wherein The First Object Is Associated With A First Virtual Machine (VM) Of A Plurality Of VMs, Wherein The First Object Is Executing In A Scheduling Context Of The First VM, Wherein The Second Object Is Registered With A Trusted Execution Environment (TEE), And Wherein The Second Object Is Associated With A Second VM Of The Plurality Of VMs
602

Receive, By The Second Object, A Call From The First Object
604

Switch The Scheduling Context To The Scheduling Context Of The Second VM Based On The Received Call From The First Object
606

Execute Code Associated With The Second Object In The Scheduling Context Of The Second VM
608

FIG. 6

VIRTUAL MACHINE BOUND SCHEDULING OF TRUSTED EXECUTION ENVIRONMENT ENTITIES

FIELD OF THE DISCLOSURE

The present disclosure generally relates to security protocols and devices. For example, aspects of the present disclosure relate to a virtual machine bound scheduling of trusted execution entities.

BACKGROUND OF THE DISCLOSURE

Modern software systems are often split into multiple modules/components that each have a different level of privilege or access to the computing device's resources (e.g., system resources, processor resources, memory resources, etc.). An example of such a split is between the operating system (OS) kernel and user applications in which the user applications are given a much more limited level of access to system resources than the OS kernel.

To facilitate similar splits at the chip level, certain processors and computing architectures (e.g., ARM, RISC-V, Hexagon DSP, etc.) include features that support hierarchical protection domains and/or implement different levels of privilege. Such systems typically only operate at one level of privilege at a time, and the level of privilege ("current privilege level") may only be changed when the device processor takes or returns from an exception. For this reason, the privilege levels are commonly called exception levels (ELs). These exception levels may be numbered (e.g., EL-0 to EL-3) so that the higher levels of privilege have higher numbers. For example, software with the lowest levels of privilege (e.g., user applications, etc.) may operate at EL-0, whereas software with the highest levels of privilege (the system monitor, etc.) may operate at EL-3.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for accessing execution environments, such as for executing code in a TEE. In one illustrative example, a method for access execution environments is provided. The method includes: calling, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receiving, by the second object, a call from the first object; switching the scheduling context to the scheduling context of the second VM based on the received call from the first object; and executing code associated with the second object in the scheduling context of the second VM.

As another example, an apparatus for accessing execution environments is provided. The apparatus includes at least one memory and at least one processor coupled to the at least one memory. The at least one processor is configured to: call, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receive, by the second object, a call from the first object; switch the scheduling context to the scheduling context of the second VM based on the received call from the first object; and execute code associated with the second object in the scheduling context of the second VM.

In another example, a non-transitory computer-readable medium having stored thereon instructions is provided. The instructions, when executed by at least one processor, cause the at least one processor to: call, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receive, by the second object, a call from the first object; switch the scheduling context to the scheduling context of the second VM based on the received call from the first object; and execute code associated with the second object in the scheduling context of the second VM.

As another example, an apparatus for access execution environments is provided. The apparatus includes: means for calling, via a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; means for receiving, via the second object, a call from the first object; means for switching the scheduling context to the scheduling context of the second VM based on the received call from the first object; and means for executing code associated with the second object in the scheduling context of the second VM.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a flow chart illustrating an example of a process for providing secure data access, in accordance with some examples.

DETAILED DESCRIPTION

Figure 1A:
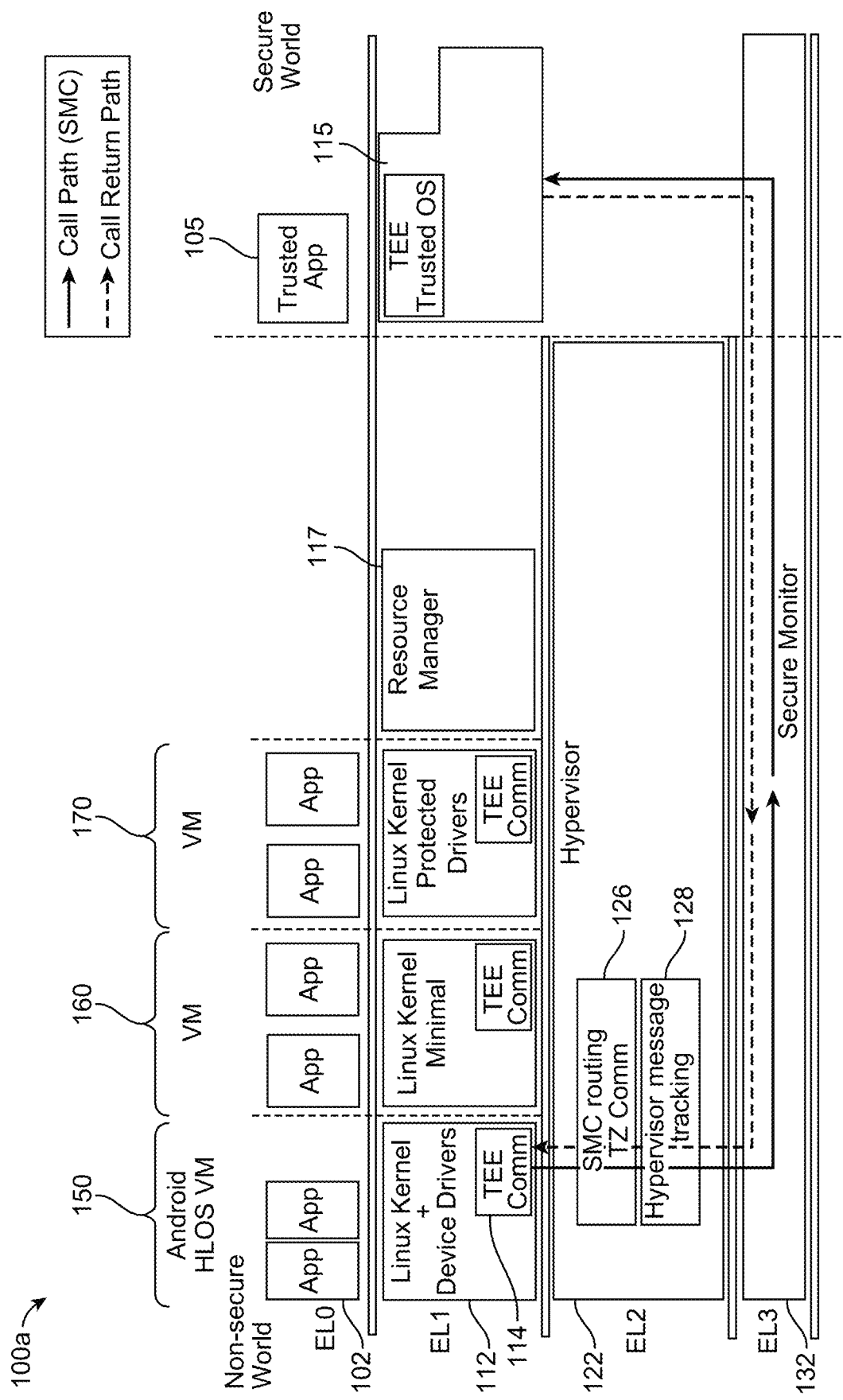
FIGS. 1A and 1B is a block diagram illustrating an example of privileges or exception levels (ELs) in an example computing device, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

The term "computing device" is used herein to refer to any of a variety of computing devices including smartphones, wireless or mobile computing devices (e.g., tablets, laptops, wearable devices, etc.), cellular-based wireless hotspots, IoT devices, eMTC devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

The term "monitor" is used herein to refer to any hardware or software component that may support virtualization technology and/or enables the abstraction (or virtualization) of computing resources, and which operates across execution environments (e.g., across a non-secure or rich/normal execution environment and a trusted/secure execution environment, etc.). This is used herein as the highest privilege level execution environment. A monitor may include any one or all of hardware monitors, specialized hardware fabricated on the chip, virtual machine monitors (VMMs), monitor software running outside of a high level operation system (HLOS), and software monitors running as part of device drivers, which may be outside the HLOS, its memory management systems, and/or its allocator functions. In some aspects, an example of a monitor is a "secure monitor," which refers to software that is designed to securely transition a processor between different security states of the processor (e.g., when supported such as in ARM processors with TrustZone technology) in order to separate the software running at lower privilege levels.

The term "hypervisor" is used herein to refer to any hardware or software component that supports virtualization technology and/or enables the abstraction (or virtualization) of computing resources, and which operates within an execution environment (e.g., within the rich/normal execution environment, etc.). A hypervisor may create and operate virtual machines (VMs) and/or host multiple operating systems (called guest operating systems) and may act as Virtual Machine Manager. The hypervisor presents the guest operating systems with a virtual operating platform and manages the execution of the guest operating systems. Each guest operating system may interact with the virtual operating platform as if it was operating on the physical hardware. This allows each guest operating system to operate under the illusion of having exclusive access to the processors, peripherals, memory and I/O of the computing system.

Figure 1B:
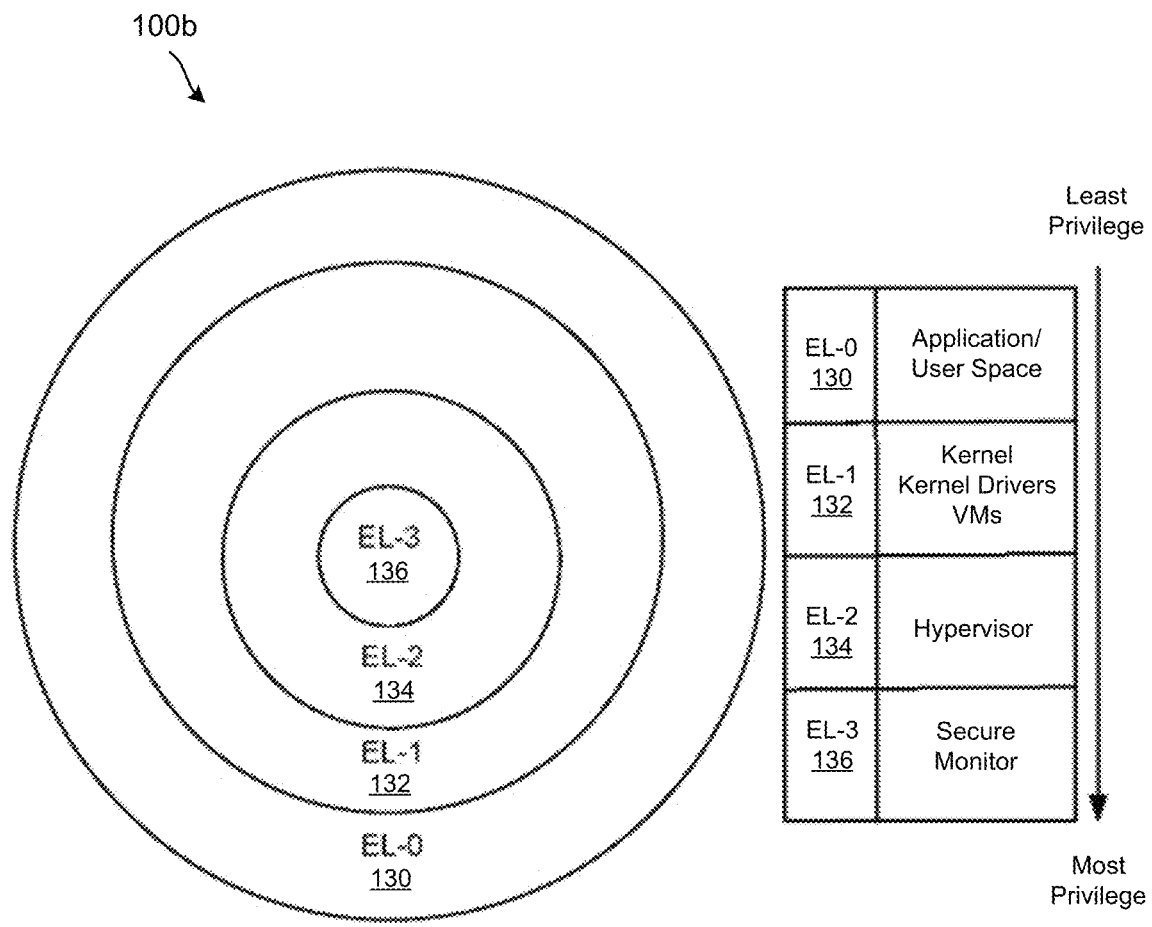

FIGS. 1A and 1B are block diagrams illustrating examples of privileges or exception levels (ELs) that can be implemented in an example computing system 100a having a Reduced Instruction Set Computer (RISC) architecture (e.g., ARM, RISC-V, etc.). For example, components in the computing system 100a may be configured to execute within various exception levels (EL) that control execution privileges to the components executing within each respective EL. In one illustrative example, the exception levels can include a first exception level EL-0, a second exception level EL-1, a third exception level EL-2, and a fourth exception level EL-3.

Each exception level can be associated with different components of the computing system 100a, with the components of a given EL having respective execution privileges corresponding to the given EL. For instance, EL-0 may control a first set of execution privileges to the components executing within EL-0; EL-1 may control a second set of execution privileges to the components executing within EL-1; etc.

In some aspects, the first exception level EL-0 can be associated with a lowest level of execution privileges and may also be referred to as the lowest privilege level. Execution at EL-0 is unprivileged execution. Increased exception level values (e.g., from 1 to 3) can correspond to increase levels of execution privileges. For example, the fourth exception level EL-3 can be associated with a highest level of execution privileges. Different exception levels can provide support for different functionalities. For instance, in the ARM architecture, EL-2 can provide support for processor virtualization via a hypervisor (e.g., such as the hypervisor 122 depicted in EL-2 of FIG. 1A, described in greater detail below). In the ARM architecture, EL-3 can provide support for two security states.

An exception can be generated when a processor (e.g., a processor associated with computing system 100a) first responds to an exceptional condition. The processor state at this time is the state that the exception is "taken from." The processor state immediately after taking the exception is the state the exception is "taken to." To return from an exception, the processor must execute an exception return instruction. The processor state when an exception return instruction is committed for execution is the state the exception "returns from." The processor state immediately after the execution of that instruction is that state the exception "returns to."

Execution can move between different exception levels only on taking an exception or on returning from an exception. For example, on taking an exception, the exception level will either increase or remain the same. The exception level cannot decrease on taking an exception (e.g., cannot move to a lower level of execution). On returning from an exception, the exception level either decreases or remains the same. The exception level cannot increase on returning from an exception (e.g., cannot move to a higher level of execution).

The exception level that execution changes to (or remains in) on taking an exception can be referred to as a target EL of the exception. In the ARM architecture, every exception type has a target EL that is either implicit in the nature of the exception or determined based on corresponding configuration bits in the system registers. An exception cannot target the EL-0 exception level (e.g., cannot target unprivileged execution).

In addition to the different exception levels EL-0-EL-3, the computing system 100a may additionally include various execution environments, including a non-secure execution environment (e.g., also referred to as a rich OS execution environment) and a trusted or secure execution environment. The trusted or secure execution environment may also be referred to as a trusted execution environment (TEE) (e.g., such as an ARM TrustZone execution environment, etc.). In some case, a TEE may reside in a virtual machine provided by the hypervisor, without the need for a secure monitor to exist, or may be involved in the transition of processor (e.g., CPU) control from one virtual machine, through the hypervisor and to the TEE. The rich execution environment may include the hypervisor 122 and the plurality of virtual machines 150, 160, 170. The secure execution environment may include the trusted application 105 and the TEE/trusted OS 115 (e.g., trust zone (TZ) component 115). A secure monitor 132 may operate across the various execution environments (e.g., the secure world and the non-secure world) and may be configured to control accesses to the secure execution environment (e.g., TEE/trusted OS 115.) FIG. 1B is a schematic diagram 100b depicting the first exception level EL-0 130 as including application and/or user space components; the second exception level EL-1 132 as including the kernel, kernel drivers, and/or VMs; the third exception level EL-2 134 as including the hypervisor and access control (AC) drivers; and the fourth exception level EL-3 136 as including the secure monitor. The exception levels are numbered (e.g., EL-0 to EL-3) such that the higher levels of privilege have higher numbers. For example, hypervisor 122 operating in EL-2 may have greater execution privileges than software applications 102 executing in EL-0.

As noted above, the Trusted Execution Environment (TEE) can be used for the safe execution of authorized security software, known as "Trusted Applications". For example, the secure world depicted in FIG. 1A can be associated with one or more trusted applications 105. The trusted applications 105 operate at the unprivileged exception level EL-0, and may be similar to one or more of the non-secure world applications 102. For example, a first instance of a particular application may execute at EL-0 of the non-secure world as a non-secure application instance 102, and a second instance of the particular application may execute at EL-0 of the secure world as a trusted application 105. The secure world and TEE can be used to provide end-to-end security by enforcing protection, confidentiality, integrity, and data access rights. Trusted applications 105 running in the secure world (e.g., executing in the TEE/trusted OS 115 at EL-1) may have access to the full power of the device's main processor and memory, while hardware isolation protects the trusted applications 105 from the non-secure applications 102 running in the rich OS associated with HLOS VM 150. In some cases, trusted applications 105 may have limited access to the device's main processor and/or memory. Trusted applications 105 may be limited to secure resources associated with or otherwise available to the TEE/trusted OS 115. For instance, trusted applications 105 running in a VM may be limited to accessing secure resources that are associated with or available to the TEE/trusted OS 115. In some examples, a secure world hypervisor (not shown in FIG. 1A) may be associated with the TEE/trusted OS 115, and can be used to control and/or limit the access of trusted applications 105 to the device's main process, memory, resources, etc. In some examples, trusted applications 105 can have limited access to device resources where the access limitation(s) are implemented by the TEE/trusted OS 115. For example, the TEE/trusted OS 115 can isolate each trusted application of one or more trusted applications 105 from one another and from the TEE/trusted OS 115 itself.

Example TEE implementations may include, for example, ARM's OP-TEE, which supports the TrustZone security state when implemented in a processor (e.g., CPU) implementing the ARM architecture. In addition to protecting the trusted applications 105 from the non-secure applications 102, the TEE 115 can use operating system controls of the processor (e.g., CPU) with privilege level and isolation protection features (e.g., the memory management unit (MMU)) to isolate Trusted Applications. In some cases, the TEE may use cryptographic techniques to load and authenticate the trusted applications 105. Example use cases for the TEE may include electronic financial service applications, such as mobile wallets, money transfers, bill payments, peer-to-peer payments, or contactless payments, etc. These financial service applications may involve user interactions, and for these applications it can be important to guarantee "What You See Is What You Sign." This objective may be achieved by a dedicated trusted application 105 running in the TEE/secure OS 115 that takes over the control of the device display from the rich OS of HLOS VM 150 and provides a safe and trusted user interaction.

Various usage models of the exception levels can be utilized or implemented by a computing system architecture (e.g., such as the architecture of the computing system 100*a*). For example, a common usage model for the exception levels is EL-0: Applications; EL-1: OS kernel and associated functions (typically described as privileged); EL-2: Hypervisor; EL-3: Secure monitor. The example computing system 100*a* of FIG. 1A depicts an example implementation of this common usage model described above.

In some examples, a computing system can be used to provide a plurality of different virtual machines (VMs). For example, as depicted in the example of FIG. 1A, the computing system 100*a* can be used to provide the VMs 150, 160, 170. The VMs can execute using the shared hardware resources associated with computing system 100*a* but remain logically separate and distinct. For purposes of explanation, when referring herein to a virtual machine performing an operation, the operation may be initiated by code running on a virtual execution context (e.g., a virtual CPU (VCPU) context). For example, a virtual machine can have at least one virtual execution context (or VCPU), which is given time to run on a CPU by the hypervisor, and which may have its state saved by the hypervisor such that a different VCPU can be restored onto a CPU to be run. Using such a technique, a hypervisor can run multiple VCPUs (and hence VMs) on the underlying physical CPU (e.g., by letting each run for a period of time).

A first VM 150 can be provided as a VM associated with a high-level operating system (HLOS) of the computing system 100*a*. For example VM 150 can be associated with an HLOS such as Android or iOS (e.g., in examples where the computing system 100*a* is a smartphone or other mobile computing device). The remaining VMs 160, 170 can be used to provide various other functionality different than that of the HLOS associated with VM 150.

EL-0 is associated with a plurality of applications 102, which operate with unprivileged execution on the computing system 100*a* (e.g., based on operating at EL-0). Each application can be associated with a different one of the VMs 150, 160, 170. For instance, a respective first and second application 102 are shown as being associated with each of the VMs 150, 160, 170. The applications 102 associated with a particular VM may the same as the applications 102 associated with a different one of the VMs. The applications 102 associated with a particular VM can additionally, or alternatively, be different from the applications 102 associated with a different one of the VMs.

EL-1 is associated with a plurality of kernel and device driver instances 112. For example, a kernel and driver instance 112 is associated with each respective one of the VMs 150, 160, 170. The kernel can correspond to the HLOS of VM 150. For example, when VM 150 is associated with an Android HLOS, the kernel can be a Linux kernel. The kernel and driver instances 112 executing at EL-1 and associated with the plurality of VMs 150-170 can be the same across VMs or can be different. In some cases, the VMs can be associated with the same kernel but different drivers. For example, the HLOS VM 150 can be associated with a full set of device drivers, the VM 160 can be associated with minimal drivers, and the VM 170 can be associated with one or more protected drivers. At least one instance of a resource manager 117 can also operate at EL-1, and may be shared across the plurality of VMs 150-170. Each kernel and driver instance 112 can include a Trusted Execution Environment (TEE) communication interface 114, which can be used to provide communications between a non-secure world (in which the plurality of VMs 150-170 operate) and a secure world. As noted above, the TEE may reside in a VM (e.g., in some cases alongside other VMs).

EL-2 is associated with a hypervisor 122, which can also be referred to as a virtual machine monitor (VMM). The hypervisor 122 can be used to create and run VMs, such as the plurality of VMs 150-170 executing at EL-0. The hypervisor 122 can oversee operations relating to the virtualization of the hardware resources of the computing system 100*a* that is used to host the plurality of VMs 150-170 (e.g., hypervisor 122 can oversee the virtual sharing of computing system 100*a* resources between the plurality of VMs 150-170). The hypervisor 122 can include a Secure Monitor Call (SMC) interface 126, which can be used to provide communications (e.g., Secure Monitor Calls) with the TEE/trusted OS 115 of the secure world.

For example, a non-secure world VM (e.g., one of the VMs 150-170) can communicate with TEE/trusted OS 115 of the secure world using the SMC routing interface 126 of hypervisor 122. In some examples, SMCs can be originated from the TEE communication interface 114 executing at EL-1 and associated with the call originating VM. For instance, in the example of FIG. 1A, an SMC associated with HLOS VM 150 as the originating VM can be originated by the TEE communication interface 114 of the EL-1 kernel and driver instance 112 corresponding to HLOS VM 150. The SMC from TEE communication interface 114 can be routing using the SMC routing interface 126, which executes at EL-2 to route the SMC on to the TEE 115 executing at EL-1 of the secure world. The SMC routing interface 126 can also be utilized in the call return path associated with an SMC callback from the TEE 115 of the secure world to the non-secure world TEE communication interface 114. In some aspects, the SMC routing interface 126 can additionally include a trust zone communication interface for communicating with TEE/trusted OS 115. The hypervisor 122 may additionally include a hypervisor message tracking interface 128, as depicted in FIG. 1A.

EL-3 is associated with a secure monitor 132 which may operate across the various execution environments (e.g., the secure world and the non-secure world) and may be configured to control accesses to the secure execution environment (e.g., TEE/trusted OS 115.) By operating at exception level EL-3, the secure monitor 132 operates at the highest exception level associated with computing system 100a and may have greater execution privileges than components operating at any of the lower exception levels EL-0-EL-2. The secure monitor 132 may include hardware and/or software components configured to support virtualization (e.g., to support the plurality of VMs 150-170) and/or to enable the abstraction or virtualization of computing resources. Secure monitor 132 can include any one or all of hardware monitors, specialized hardware fabricated on the chip, virtual machine monitors (VMM), monitor software running outside of a high level operation system (HLOS), and software monitors running as part of device drivers, which may be outside the HLOS, its memory management systems, and/or its allocator functions. The secure monitor 132 may operate in both the rich execution environment (e.g., non-secure world) and the trusted execution environment (e.g., secure world). In some cases, the secure monitor 132 may host the hypervisor 122 (e.g., the secure monitor 132 and the hypervisor 122 may be part of the same software).

In addition to the components depicted in FIG. 1A, the computing system 100a may also include various additional functional components configured to accomplish various functions described herein, such as a host operating system, a DSP operating system, library modules, software application programs, user processes, listener call contexts (e.g., listener threads), execution hardware (e.g., an application processor, DSP, etc.), input/output devices, memories, etc. In some aspects, as used herein, a "listen call" can refer to an event listener. In the context of a TEE (e.g., such as TEE 115 of FIG. 1A) and/or arbitrary destination callback invocation (ADCI), a listen call can be a VM service registration call. For instance, a VM (e.g., such as one of the VMs 150-170 of FIG. 1A) can make a call into a TEE (e.g., TEE 115) which never returns and waits to handle a request from the TEE for a VM service. For example, one of the VMs 150-170 can make a call into TEE 115. The call from the VM into TEE 115 does not return and waits to handle a future or subsequent request from the TEE 115 for a VM service of the calling VM (e.g., the particular one of VMs 150-170 that made the call into TEE 115). As noted above, a "listen call" may also be referred to as an "event listener." The event is a return from SMC which includes a request for a VM service as an extra return code.

A listener call context can refer to a VM SMC call that is waiting to handle a VM service request from the TEE (e.g., TEE 115). In an ADCI example, the listener call context can be the SMC that is in a 'sleep' state waiting for an event. The event can be an interrupt to call into the TEE (e.g., TEE 115) to handle the VM service request.

The 'sleep' state can be associated with putting the listener call context (e.g., VM SMC call) to sleep. ADCI is a protocol that can be used to return an implementation-specific SMC return code that causes the caller (e.g., the VM SMC call or listener call context) to be put to sleep until it later receives a wake event. Receiving the wake event can cause the sleeping caller to resume (e.g., wake from sleep). The wake event can be delivered as an interrupt when an implementation-specific SMC return code is returned from the TEE (e.g., TEE 115).

A callback service can refer to a VM service. For example, the callback service can be the VM service associated with a VM service request (e.g., such as the VM service request from the TEE and associated with the listener call context, as described above). In some aspects, a callback service can refer to the logic in a VM that runs and provides data (e.g., returns data) to the TEE (e.g., TEE 115) when requested by the TEE in a callback service request.

A callback service request (e.g., also referred to as a "callback request") can refer to a VM service request from the TEE (e.g., TEE 115).

In some aspects, the terms "listener" and "callback" may be used interchangeably.

As noted previously, the hypervisor 122 may be a software control program between an operating system and the secure monitor 132. The hypervisor 122 may host multiple operating systems (e.g., also referred to as guest operating systems). Each guest operating system may be associated with one or more VMs of the plurality of VMs 150-170 and may communicate with the hypervisor 122 and/or the secure monitor 132 in the same manner it would communicate with the physical hardware of computing system 100a. For instance, each VM of the plurality of VMs 150-170 can be viewed as a combination of hypervisor 122, secure monitor 132, and underlying hardware of computing system 100a. This allows each guest operating system associated with a particular VM of the plurality of VMs 150-170 to operate under the illusion of having exclusive access to the processors, peripherals, memory, I/O, etc. of the host computing system 100a.

The hypervisor 122 may be configured to manage memory access requests by the virtual machines 150-170. Operating systems are generally responsible for partitioning the physical memory across multiple processes. However, in systems that include a guest operating system running on top of a virtual machine 150-170, the memory allocated by the guest operating system is an intermediate physical memory rather than a true physical memory. On such systems, the hypervisor 122 is responsible for the actual allocation of the physical memory.

In some cases, the virtual machines may be software applications that execute software application programs in combination with the hypervisor 122. For example, the hypervisor 122 can be implemented based on a particular CPU architecture utilized by or associated with the underlying physical hardware of computing system 100a. For instance, the virtual machines implemented using hypervisor 122 can take advantage of the CPU architecture support for virtualization and running of software code at EL-1 and/or EL-0, with access to hardware resources (e.g., of the physical hardware of computing system 100a) and temporal resources mediated by the hypervisor 122. In some examples, the virtual machines can be implemented in combination with the hypervisor 122, without using emulation or with limited emulation performed by hypervisor 122. By creating and managing virtual machines (e.g., such as the plurality of VMs 150-170), the computing system 100a may create a "sandbox" (e.g., secured separation) around various features, including operating systems, applications, processes, etc. The computing system 100a may use these sandboxes to enforce access control among various features of the device.

The non-secure world and secure world execution environments may be loaded via a secure boot procedure. Generally, secure boot is a boot sequence in which each software image that is loaded and executed on the computing system 100a is authenticated and/or authorized via previously authenticated/authorized software. The boot sequence may be configured to prevent unauthorized or modified code from being run on the computing device by ensuring that each software image is checked before it is executed. The first image in the boot sequence is called the Primary Boot Loader (PBL), which is often stored in an immutable read-only memory that cannot be physically altered. The PBL authorizes each software image that is loaded and executed on the computing system 100*a* by cryptographically verifying digital signatures on each software image it loads. Those software images cryptographically verify the digital signatures on the next set of images that they load, and so on. This ensures that the software images have not been altered. In some examples, the PBL may be configured to load a first image and a second image, where the first image is a boot loader image and the second image is a trusted secure boot loader image. The first image may be configured to coordinate the loading of the rich execution environment (e.g., non-secure world), which may include the OS kernel and peripheral firmware images. The second image may be configured to coordinate the loading of the trusted execution environment (e.g., secure world), which may include the TEE 115 and TEE-related images. The separation and isolation of the TEE images during the loading process may improve security by shortening the chain of images that must be loaded, authorized and executed before the TEE image is operational. The second image may also configure the secure monitor 132 or other access control system to isolate memory used by the TEE 115 and/or the secure world execution environment from all other execution environments on the chip, and then execute the first image at a less-privileged exception level.

The hypervisor and VMs need to be booted up, after which a VM can make calls into a TEE from its communication driver. The TEE can then require the service from a VM. In some cases, the TEE may need to request one or more services that are provided by a VM executing in the non-secure world environment. For example, TEE 115 may need to request one or more services from a particular one of the non-secure world VMs 150, 160, or 170. Examples of VM services that may be requested by TEE 115 include, but are not limited to, Secure File System (SFS) services, Replay Protected Memory Block (RPMB) services, Secure Channel services, and/or time services, among various others.

In existing approaches to TEEs and VM services, the TEE 115 is invoked from the normal world (e.g., non-secure world) through a Secure Monitor Call (SMC). For example, the TEE 115 can be invoked by HLOS VM 150 using an SMC generated by TEE communication interface 114. The SMC can be routed to the secure world TEE 115 by the SMC routing interface 126 included in the hypervisor 122, as was described previously above.

The TEE 115 can only return (e.g., with an exception return (ERET) instruction) to the normal (non-secure) world (e.g., to the secure monitor) in response to an SMC. For instance, the TEE 115 does not initiate contact with the normal world and is configured only to communicate with the normal world via an SMC callback request that is returned synchronously in response to an SMC (SMC callback) it has received from the VM (e.g., in lieu of returning the results of the requested SMC). Additionally, a return from the TEE 115 (e.g., a return to the normal world) can only request a VM service from the caller VM associated with the return. The caller VM is the VM generating the SMC that triggers the SMC callback from TEE 115. For instance, other VMs will not be concurrently issuing SMC instructions (e.g., which are the only valid way to receive the SMC callback). The SMC results/callback response may be passed from a higher EL to a lower EL in general-purpose registers, along with the exception return to the SMC instruction issued by the VM. An exception return to a VM that was pre-empted at any other instruction would be corrupted by the unexpected change of registers.

The TEE 115 is therefore unable to initiate calls to a VM or a hypervisor of the normal world (e.g., TEE 115 cannot initiate calls to the plurality of VMs 150-170 and additionally cannot initiate calls to hypervisor 122 or the SMC routing interface 126 thereof). Based on the inability of the TEE to initiate calls to VMs or hypervisors, many approaches for implementing normal world VMs that operate in combination with a secure world TEE require all VM services to be hosted in the primary VM (e.g., such as HLOS VM 150 of FIG. 1A). For example, when multiple VMs and/or multiple VM configurations operate in the normal world, there is no mechanism for the TEE to request a VM service that is hosted in any VM other than the SMC caller VM. In these approaches, because all VM services are hosted in the primary VM, SMCs and/or SMC callbacks between the normal world and the TEE are routed through the primary VM as well.

In some cases, an SMC call may be initiated between a selected VM of a plurality of VMs executing in a normal world of the same computing device and a TEE. In some cases, the TEE may run in a scheduling context of a calling VM (e.g., in timeslices allocated to the calling VM by a scheduler). In some cases, if the TEE executing in the first scheduling context of the first VM initiates a callback via ADCI or other mechanism to a second VM as a part of executing a trusted application or service in the TEE, the callback in the second VM, the code dispatching it from the TEE and the code receiving the response may execute in the scheduling context of the second VM. After the callback completes, an attempt may be made to wake the first VM. However, when attempting to wake the first VM, if the first VM does not respond (e.g., is malicious, unresponsive, hung, etc.) then access to the trusted application or service in the TEE may be blocked.

Systems, apparatuses, processes (also referred to as methods), and computer-readable media (collectively referred to as "systems and techniques") are described herein that can be used to provide a virtual machine bound scheduling of trusted execution entities. In some cases, scheduling context switching may be performed by binding access to specific resources from other VMs to perform the scheduling context switch. For example, a first object, such as a function, executing in a scheduling context of a first VM may call a second object. The second object may be registered with the TEE and associated with a second VM such that the second object may call code which executes in the scheduling context of the second VM. In some cases, the call to the second object may be bound to a VM scheduling context switch such that calling the second object causes the scheduling context to switch from the scheduling context of the first VM to the scheduling context of the second VM. In some cases, the VM scheduling context switch binding may be added as a layer on top of the scheduler in the kernel that schedules TEE tasks.

Figure 2:
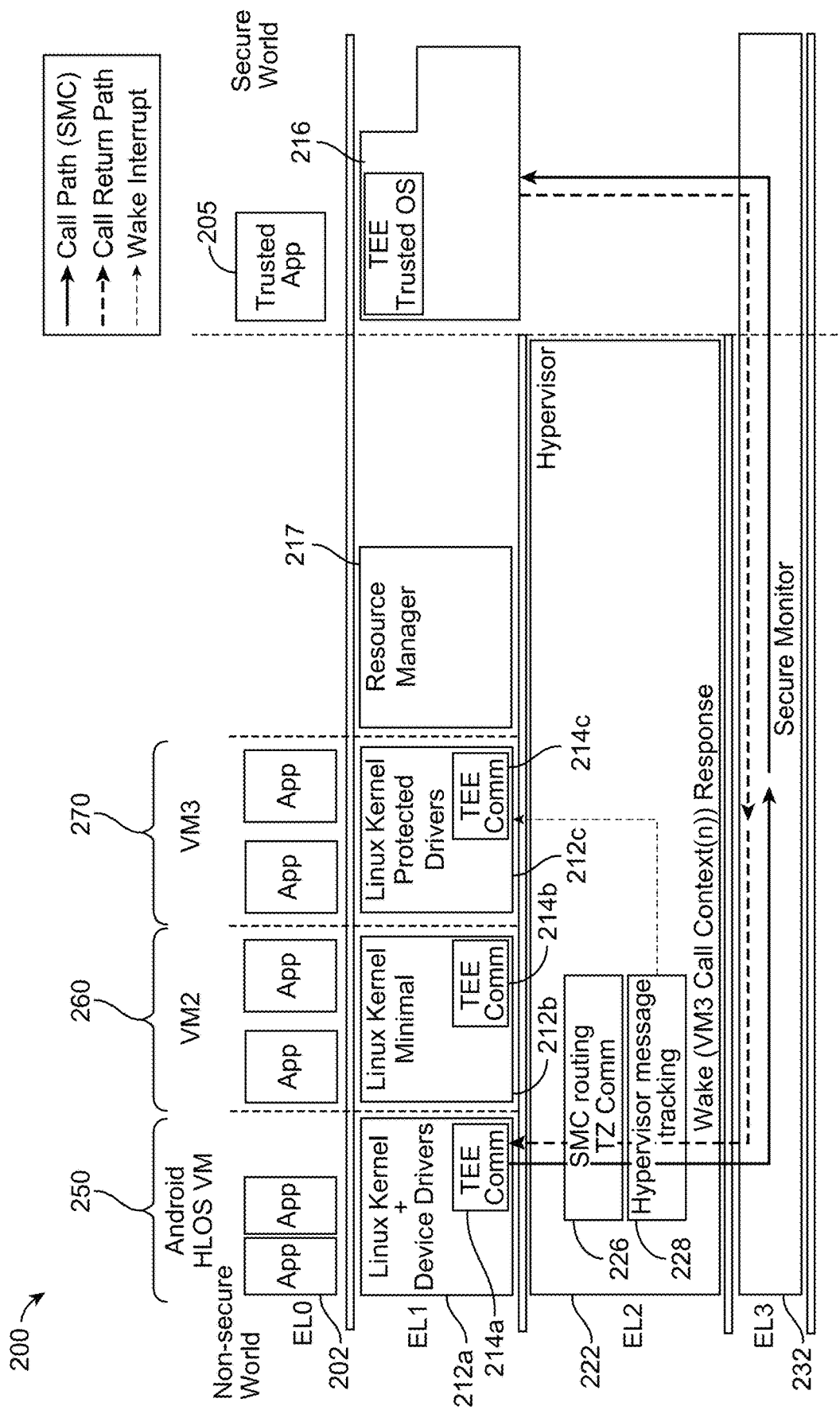
FIG. 2 is a block diagram illustrating an example of a virtual machine (VM) call waking a previously sleeping call from a different VM, in accordance with some examples.

FIG. 2 is a block diagram illustrating an example of a virtual machine (VM) call resulting in waking a previously sleeping call from a different VM, in accordance with some examples. As illustrated, a computing system 200 of FIG. 2 can be similar to the computing system 100*a* described above with respect to FIG. 1A. For example, the computing system 200 can include a plurality of VMs 250, 260, 270 that may be the same as or similar to the plurality of VMs 150, 160, 170 of FIG. 1A. The plurality of normal world (e.g., non-secure world) applications 202 can be the same as or similar to the plurality of normal world applications 102 of FIG. 1A The kernel and driver instances 212a, 212b, and 212c can be the same as or similar to the kernel and driver instances 112 of FIG. 1A. The resource manager 217 can be the same as or similar to the resource manager 117 of FIG. 1A. The TEE communication interfaces 214a, 214b, and 214c can be the same as or similar to the TEE communication interface 114 of FIG. 1A. The hypervisor 222 can be the same as or similar to the hypervisor 122 of FIG. 1A. The SMC routing interface 226 can be the same as or similar to the SMC routing interface 126 of FIG. 1A and/or the hypervisor message tracking interface 228 can be the same as or similar to the hypervisor message tracking interface 128 of FIG. 1A. The secure monitor 232 can be the same as or similar to the secure monitor 132 of FIG. 1A. The secure world trusted application(s) 205 can be the same as or similar to the secure world trusted application(s) 105 of FIG. 1A. The TEE/trusted OS 215 can be the same as or similar to the TEE/trusted OS 115 of FIG. 1A.

In one illustrative example, VM 250 can generate and transmit an SMC to the TEE/trusted OS 215. As described previously (e.g., with respect to FIG. 1A), the SMC from VM 250 can be generated using a TEE communication interface 214a of the kernel and device drivers instance 212a associated with VM 250 at the EL-1 exception level. The SMC can be transmitted from TEE communication interface 214a to the SMC routing and TEE communication interface 226 of hypervisor 222 and/or can be transmitted to the hypervisor message tracking interface 228 of hypervisor 222.

The hypervisor 222 can route the SMC from the normal world (e.g., non-secure execution environment) to the TEE/trusted OS 215 of the secure world. In response to a determination that the SMC cannot acquire one or more TEE waitq-queue aware resources associated with the SMC, the SMC from VM 250 can be returned to sleep in the calling VM. As illustrated in FIG. 2, the calling VM is the HLOS VM 250. In some aspects, the SMC can be returned to sleep via thread sleep. The thread sleep can be mediated by the hypervisor 222.

In one illustrative example, the TEE 215 may determine that the SMC from VM 250 requires one or more VM resources hosted at a different VM. For example, TEE 215 may determine that the SMC from VM 250 requires the use of a VM resource hosted at VM 270. Because TEE 215 can only return to the calling domain (e.g., the calling VM 250), TEE 215 cannot return to VM 270 in order to access the needed resource at VM 270 for servicing the SMC received from VM 250.

Instead, an SMC callback request can be posted in TEE 215 for the first VM 250, and TEE 215 can transmit an SMC_WAITQ_WAKE return code to wake the first VM 250. The hypervisor 222 can receive, process, and/or route the SMC_WAITQ_WAKE return code from TEE 215. For instance, SMC routing and TEE communication interface 226 and/or hypervisor message tracking interface 228 can be used to receive, process, and/or route the SMC_WAITQ_WAKE return code from TEE 215 and route the wake return code to first VM 250. In one illustrative example, the SMC_WAITQ_WAKE return code can be transmitted between TEE 215 and hypervisor 222 using a call return path as indicated in FIG. 2. The hypervisor message tracking interface 228 can subsequently utilize a wake interrupt path to transmit the SMC_WAITQ_WAKE return code to the VM 270 that hosts the VM service needed for the SMC from VM 250.

Further details of the SMC callback service implemented by the systems and techniques described herein for arbitrary destination callback invocation (ADCI) by the TEE 215 will be described in greater depth below with respect to the example ADCI call flow 400 of FIG. 4.

Figure 3:
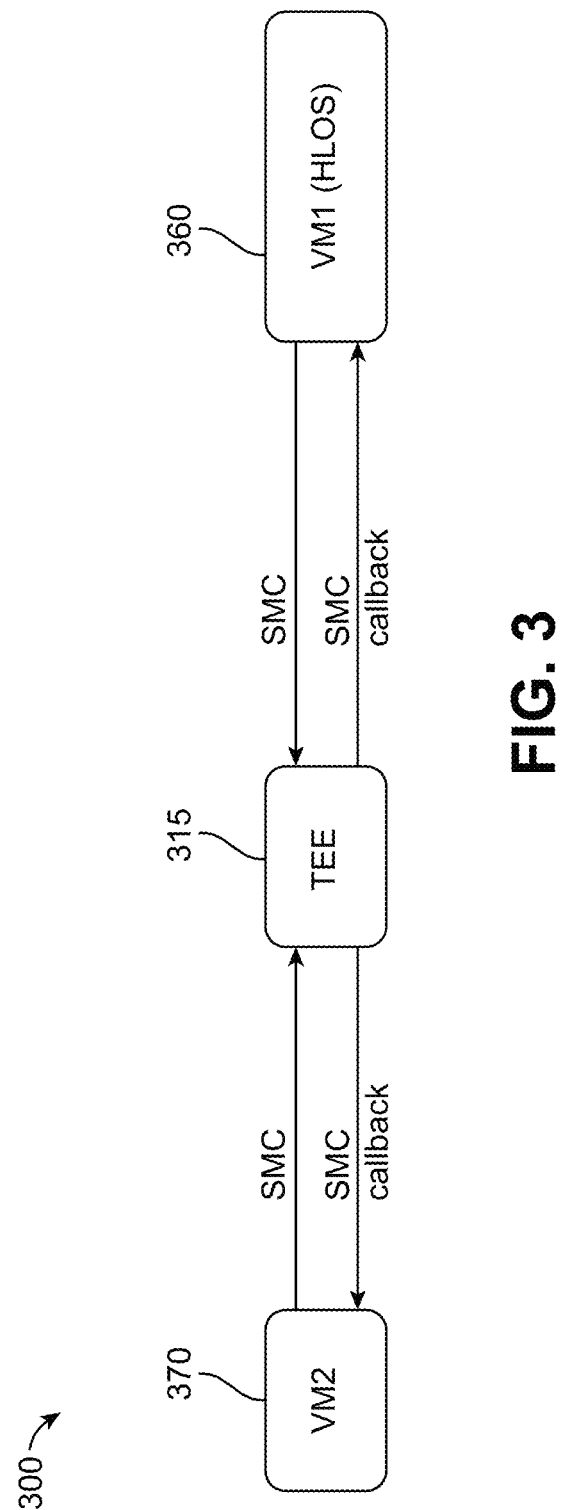
FIG. 3 is a diagram illustrating an example of Secure Monitor Calls (SMCs) and SMC callbacks transmitted between VMs and a Trusted Execution Environment (TEE), in accordance with some examples.

FIG. 3 is a diagram 300 illustrating an example of Secure Monitor Calls (SMCs) and SMC callbacks transmitted between VMs and a Trusted Execution Environment (TEE), in accordance with some examples. For instance, the systems and techniques described can leverage an existing SMC_WAITQ framework to have SMCs return and sleep in the calling VM until a corresponding wake event is received from the TEE. In one illustrative example, one or more (or all) of the VMs included in a plurality of VMs running on a computing system (e.g., such as computing system 200 of FIG. 2) can initialize the ADCI callback service described herein. For example, at initialization time, each VM hosting VM services can call in to the TEE 315 to register a respective callback service with the TEE 315 to listen for an SMC callback requesting a VM service from the respective VM.

For example, a first VM 360 can call in to the TEE 315 using an SMC to register an SMC callback service which first VM 360 can use to listen for an SMC callback from TEE 315 requesting a VM service from first VM 360. Similarly, a second VM 370 can call in to the TEE 315 using an SMC to register an SMC callback service which second VM 370 can use to listen for an SMC callback from TEE 315 requesting a VM service from second VM 370. In some aspects, the first VM 360 and the second VM 370 can use the same type of SMC message to initialize and register their respective ADCI SMC callback service with TEE 315.

The TEE 315 can subsequently determine if a service callback is pending for each VM that has initialized or registered the SMC callback service with TEE 315. For example, a pending service callback for a given VM may be posted to the TEE 315 in response to receiving an SMC from a different VM requesting a VM service hosted by the given VM (as will be explained in greater depth below with respect to the example ADCI call flow 400 of FIG. 4). If no service callback is pending for a respective VM registered with the SMC callback service, the TEE 315 will put the SMC request for the respective VM to sleep. For instance, to put an SMC request for a respective VM to sleep, the TEE 315 can return an SMC_SLEEP return code (e.g., an SMC_WAITQ_SLEEP return code). For example, the TEE 315 can return the SMC_WAITQ_SLEEP return code using the respective SMC callbacks depicted in FIG. 3 between the TEE 315 and the first and second VMs 360, 370.

When a service request is raised for a particular VM, and the particular VM has a sleeping listen call registered with the TEE 315 (e.g., the VM is one of the registered VMs of the TEE 315's SMC callback service), the TEE 315 will issue an SMC_WAKE for the particular VM. The SMC_WAKE can wake the sleeping listener call context (e.g., the sleeping listener thread) in the particular VM. In some cases, the SMC_WAKE can be an SMC_WAITQ_WAKE return code. A hypervisor associated with the VM(s) can issue an interrupt request (IRQ) to the particular VM, if needed to wake the VM. Subsequently, the awakened VM will issue an SMC_RESUME call (e.g., an smc_waitq_resume call) to the TEE 315. The TEE 315 can respond to the SMC_RESUME with an SMC callback to invoke the VM service corresponding the service request previously raised for the particular VM.

Figure 4:
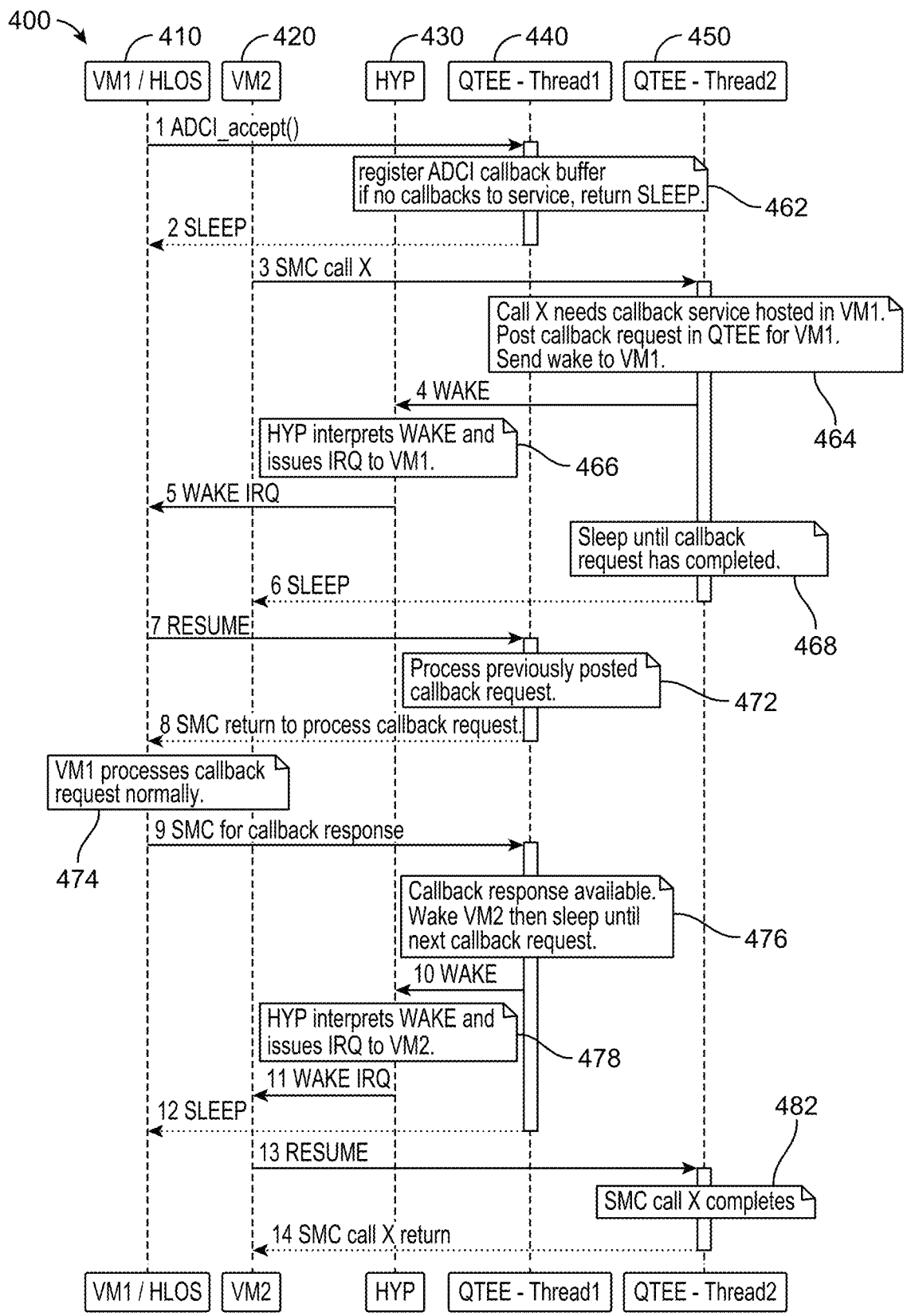
FIG. 4 is a diagram illustrating an example call flow for providing arbitrary destination callback invocations, in accordance with some examples.

FIG. 4 is a diagram illustrating an example call flow 400 for providing arbitrary destination callback invocations, in accordance with some examples. The example call flow 400 can be implemented between a first VM 410, which may be an HLOS VM (e.g., such as the HLOS VM 250 of FIG. 2); a second VM 420 (e.g., which may be the same as the VM 270 of FIG. 2); a hypervisor 430 (e.g., which may be the same as the hypervisor 222 of FIG. 2); a first TEE thread 440; and a second TEE thread 450. In some examples, the first TEE thread 440 and the second TEE thread 450 can be implemented at a TEE that is the same as or similar to the TEE 215 of FIG. 2.

In some cases, a HLOS VM 410 may register a callback service with the TEE (not shown). For example, VM 410 can call in to first TEE thread 440 to register an ADCI callback service (e.g., callback object).

In a first operation (e.g., operation 1) of call flow 400, the HLOS VM 410 may call into the first TEE thread 440 to initiate a process which allows a callback to be performed. For instance, the ADCI_accept message can used to accept or register the implementation of arbitrary destination callback invocation (ADCI) between the HLOS VM 410 and the first TEE thread 440. The first TEE thread 440 can register an ADCI buffer (e.g., as depicted at 462). In some cases, the first TEE thread 440 may execute in a scheduling context of the first VM 410 (e.g., in timeslices allocated to the calling VM (e.g., first VM 410) by a scheduler, which determines (e.g., schedules) which threads and/or processes should be executed) as the first TEE thread 440 is initiated by the first VM 410.

In a second operation (e.g., operation 2) of the call flow 400, the first TEE thread 440 can return a sleep message or command to the HLOS VM 410. For example, the first TEE thread 440 can return the sleep message based on determining that there are no callbacks (e.g., SMC callbacks) to service. In some aspects, the sleep message returned to the HLOS VM 410 can be indicated using an SMC_WAITQ_SLEEP return code.

In a third operation (e.g., operation 3) of the call flow 400, the second VM 420 can generate and transmit an SMC to a second TEE thread 450. The second VM 420 can be different than the HLOS VM 410, but implemented or otherwise executed on the same computing device (e.g., such as computing system 200 of FIG. 2). The second TEE thread 450 can be different than the first TEE thread 440, but can be implemented or otherwise executed on the same TEE (e.g., such as the TEE 215 of FIG. 2). In some cases, the second TEE thread 450 may execute in a scheduling context of the second VM 420 as the second TEE thread 450 is initiated by the second VM 420.

Based on receiving the SMC X from second VM 420 in operation 3, the TEE can determine that servicing the SMC X needs a callback service hosted in a VM other than second VM 420. For instance, as depicted at 464, the TEE can determine that the SMC X from second VM 420 requires an SMC callback to a VM service hosted in HLOS VM 410. In one illustrative example, an SMC callback request can be posted in the TEE for the HLOS VM 410 (e.g., the VM identified as hosting the VM service needed for SMC X from second VM 420).

In a fourth operation (e.g., operation 4) of the call flow 400, the TEE can additionally generate and transmit a wake message to the HLOS VM 410. The wake message can be transmitted in response to the SMC X received from second VM 420 and analyzed by the TEE at operation 462. For instance, the wake message can be transmitted based on the TEE posting the callback request in the TEE for HLOS VM 410.

The wake message transmitted by the TEE to HLOS VM 410 can be mediated or otherwise routed by a hypervisor 410 associated with the HLOS VM 410. For example, hypervisor 430 can receive and route the wake call to HLOS VM 410 (e.g., using the SMC routing and TEE communication interface 226 of FIG. 2 and/or using the hypervisor message tracking interface 228 of FIG. 2).

In a fifth operation (e.g., operation 5) of the call flow 400, the hypervisor 430 can transmit an interrupt request (IRQ) to the VM 410. For instance, hypervisor 430 can generate and transmit a WAKE IRQ message to VM 410. In some aspects, the wake message can be an SMC_WAITQ_WAKE return code that is generated and transmitted by the second TEE thread 450 (and forwarded/routed by the hypervisor 430). In some cases, the VM 410 can acknowledge the SMC_WAITQ_WAKE return code received in operation 5 by transmitting an smc_waitq_wake_ack SMC.

In one illustrative example, at 466, the hypervisor 430 can interpret the wake message and issue an interrupt request (IRQ) to the corresponding VM (e.g., VM 410). In some aspects, the hypervisor 430 can use the hypervisor message tracking interface 228 of FIG. 2 to interpret the wake message and can use the SMC routing interface 226 to route the wake message to the corresponding VM (e.g., VM 410). As indicated at 468, the corresponding thread in the TEE (e.g., which here is the second TEE thread 450) can sleep until the callback request posted in the TEE for VM 410 at operation 464 has been completed. As the second TEE thread 450 is waiting for the completed callback request, the second TEE thread 450 is considered busy (e.g., by the hypervisor 430).

In a sixth operation (e.g., operation 6) of the call flow 400, the second TEE thread 450 can return a sleep message to the calling VM, which in this example is VM 420. In some aspects, the sleep message returned to the calling VM 420 can be indicated using an SMC_WAITQ_SLEEP return code.

In a seventh operation (e.g., operation 7) of the call flow 400, the first VM 410 can generate and transmit to the TEE an SMC indicating that a VM resource (of VM 410) has been released or is already released. The VM resource at the first VM 410 that is released can be the same as the VM resource needed for the SMC X transmitted from second VM 420 to the TEE at operation 3. In some aspects, the VM 410 can transmit an smc_waitq_resume call to indicate to the TEE (e.g., to indicate to the first TEE thread 440) that the VM resource of VM 410 has been released or otherwise resumed.

In response to receiving the smc_waitq_resume SMC from the first VM 410, at operation 472, the first TEE thread 440 can process the previously posted SMC callback request posted in the TEE for VM1 (e.g., the SMC callback request posted in the TEE for VM1 at operation 464, based on the SMC X from VM 420). In some cases, after the callback request has been sent by the second TEE thread 450, the first VM 410 may resume in the scheduling context of the first VM 410. The first TEE thread 440, in response to the smc_waitq_resume SMC from the first VM 410 may start processing in the scheduling context of the first VM 410.

In an eighth operation (e.g., operation 8) of the call flow 400, and based on processing the previously posted SMC callback request at operation 472, the first TEE thread 440 can generate and transmit an SMC return (e.g., callback) for the requested VM resource at the first VM 410.

At operation 474, the SMC callback return from the first TEE thread 440 (e.g., generated and transmitted at operation 8) can cause the first VM 410 to process the callback request for SMC X normally. The first VM 410 can process the SMC callback request at an operation 474, for example by using the requested VM service associated with the SMC X (from second VM 420) to process the SMC callback request.

In a ninth operation (e.g., operation 9) of the call flow 400, the first VM 410 can generate and transmit an SMC corresponding to a callback response determined at operation 474 by processing the SMC callback request using the appropriate VM service of the first VM 410. The SMC for the callback response can be transmitted from the first VM 410 to the first TEE thread 440.

At operation 476, the first TEE thread 440 can determine that an SMC callback response is available (e.g., available for the SMC callback request posted in the TEE for first VM 410 at operation 464, which is the same as the SMC callback request associated with the sleep operation 468 at second TEE thread 450. Additionally, the first TEE thread 440 can wake the second VM 420 based on determining that the SMC callback request is available. The first TEE thread 440 can wake the second VM 420 using an SMC_WAIT-Q_WAKE return code. After waking the second VM 420, the first TEE thread 440 can then sleep until the next callback request is posted in the TEE (e.g., posted for the first VM 410 and/or posted for a VM corresponding to the first TEE thread 440).

In a tenth operation (e.g., operation 10) of the call flow 400, the first TEE thread 440 can transmit the SMC_WAIT-Q_WAKE return code to the hypervisor 430. The hypervisor 430 interprets the SMC_WAITQ_WAKE return code and issues a corresponding interrupt request (IRQ) to the second VM 420 (e.g., at operation 478).

In an eleventh operation (e.g., operation 11) of the call flow 400, the hypervisor 430 generates and transmits the WAKE interrupt request to the second VM 420. The WAKE interrupt request of operation 11 can be the same as or similar to the WAKE interrupt request of operation 5 (e.g., as described previously above).

In a twelfth operation (e.g., operation 12) of the call flow 400, the first TEE thread 440 can return a sleep message to the first VM 410. In some aspects, the sleep message returned to the VM 410 can be indicated using an SMC_WAITQ_SLEEP return code (e.g., the same as or similar to the sleep message and/or SMC_WAITQ_SLEEP return code described above with respect to operation 6).

In a thirteenth operation (e.g., operation 13) of the call flow 400, the second VM 420 can generate and transmit to the second TEE thread 450 a RESUME SMC. The RESUME SMC of operation 13 can cause the second TEE thread 450 to resume processing of the SMC X transmitted by the second VM 420 at operation 3. In some cases, second VM 420 can generate and transmit the RESUME SMC as an smc_waitq_resume SMC, which may be the same as or similar to the smc_waitq_resume SMC of operation 7. In some examples, the smc_waitq_resume call can be generated by the second VM 420 based on the second VM 420 determining that the first VM 410 has completed processing of the SMC callback request. In some examples, the smc_waitq_resume call can be generated by the second VM 420 in response to the WAKE interrupt request (e.g., smc_waitq_resume) from first TEE thread/hypervisor 430 in operations 10 and 11, respectively. In some cases, as the first TEE thread 440 has gone to sleep and the calling VM (e.g., the second VM 420) has resumed and sent the RESUME SMC to the second TEE thread 450, the TEE may stop operating in the scheduling context of the first VM 410 and resume operating in the scheduling context of the VM which issued the callback request (e.g., second VM 420).

After receiving the smc_waitq_resume call from second VM 420 in operation 13, the second TEE thread 450 can complete the SMC X that is associated with second VM 420 and required use of a VM resource at first VM 410. The SMC X can be completed by second TEE thread 450 at operation 482.

In a fourteenth operation (e.g., operation 14) of the call flow 400, the second TEE thread 450 can generate and transmit, to second VM 420, an SMC X return, indicative of the completed SMC X from operation 482.

In some cases, the TEE may not control its scheduling as the TEE runs when the TEE is called, such as when a VM calls into the TEE. In such cases, the TEE may run in a scheduling context of the calling VM (e.g., in timeslices allocated to the calling VM by a scheduler, which determines (e.g., schedules) which threads and/or processes should be executed). In some cases, to help reduce potential attack surface, the TEE and trusted applications executing in the TEE may be single threaded. Because the TEE and/or trusted applications are single threaded and run in the scheduling context of the calling VM, if a call in the TEE initiated from the first VM initiates a callback to a resource or service belonging to a second VM as a part of executing a trusted application and when attempting to wake the first VM is made on completion of the callback, the first VM does not respond (e.g., is malicious, unresponsive, hung, etc.) then access to the trusted application or service by the TEE or other VMs may be blocked. As a more detailed example referring to FIG. 4, in response to operation 3, the second TEE thread 450 may be executing in the scheduling context of the second VM 420. The fourth operation through the twelfth operation (e.g., operations 4 through 12) may then proceed as described above with respect to FIG. 4. As of the twelfth operation, VM 420 has not yet returned back to the second TEE thread 450 and the second TEE thread 450 may be considered busy as the SMC call X has not yet completed and the second VM 420 and/or second TEE thread 450 have not yet resumed operations. If the second VM 420 fails to resume (e.g., in response to the WAKE interrupt request from the eleventh operation (e.g., operation 11)), all the TEE resources acquired by thread 450 from call 3 are still considered busy and unavailable to the TEE and to tasks scheduled on the TEE by other VMs, which may be considered a denial of service issue.

As discussed above, the ADCI helps allow trusted applications and services executing in the TEE to make calls into a different VM from the VM which called into the TEE. In some cases, ADCI may allow the TEE to call into different VMs by defining a VM scheduling boundary in the TEE and triggering a VM scheduling switch when code execution reaches the boundary. This allows code executing on one side of the boundary to be scheduled in the context of a first VM, and code executing on the other side of the boundary to be scheduled in the context of a second VM. In some cases, the scheduling boundaries of ADCI may be leveraged to help avoid denial of service issues.

Figure 5:
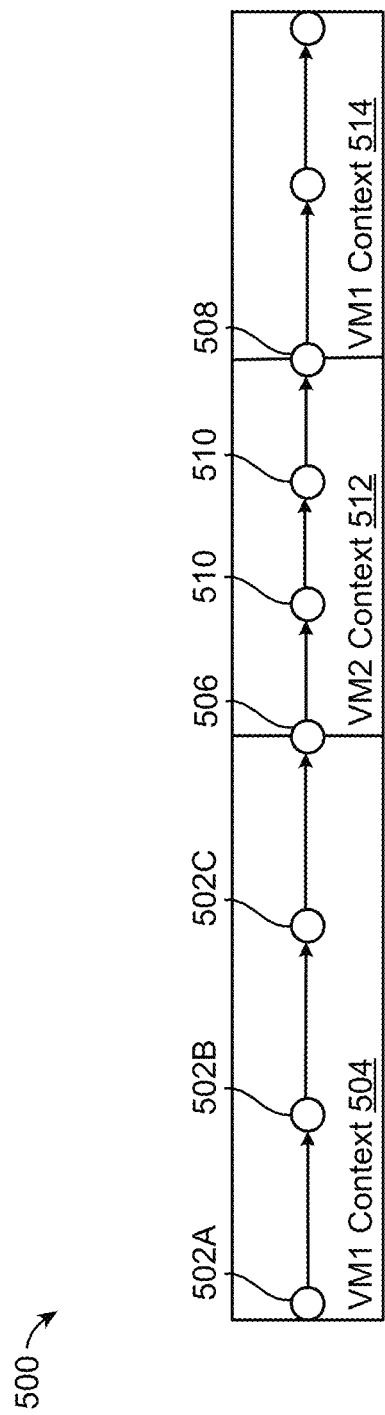
FIG. 5 illustrates scheduling contexts with respect to object execution for a TEE, in accordance with aspects of the present disclosure.

FIG. 5 illustrates scheduling contexts with respect to object execution for a TEE 500, in accordance with aspects of the present disclosure. Code executing on a first VM (e.g., VM1) executes in a scheduling context of the first VM and the code executing on the first VM may call (e.g., via function calls, creating/using/deleting objects, accessing remote objects via API calls, calling another object, etc.) an object 502A (e.g., make a function call into the object) that executes on a first thread of the TEE. As shown in FIG. 5, objects 502A-502C (collectively "objects 502") may execute in the first TEE thread, such as for a trusted application or TEE service, and this first TEE thread may execute in the scheduling context of the calling VM, here the first VM scheduling context 504. As the TEE may not perform scheduling on its own, the TEE thread may use the scheduling context of the calling VM.

The object 502A may call other objects 502B, 502C of the TEE which may perform work within the first TEE thread and/or first VM and these objects may also be executed in the scheduling context of the first VM. In some cases, objects 502 of the TEE may be local objects (e.g., functions) of the TEE, or may be objects that were registered with the TEE (e.g., the registered ADCI callback service). The objects 502, 506, 508 and 510 may be abstracted in such a way that a calling object does not know if the called object is executing wholly in the TEE or if some portion or all of the called object is executing in the calling VM (e.g., first VM) or another VM and returning back to the first TEE thread. Where execution of the objects 502 remain in the first TEE thread and/or first VM, the scheduling context remains that of the first VM.

In some cases, scheduling context switching may be performed by binding access to specific resources to performing the scheduling context switch rather than performing a scheduling context switch in response to executing an object associated with another scheduling context (e.g., made available by another VM).

For example, a first TEE thread executing in the scheduling context of the first VM 504 may call (e.g., invoke) a proxy object, such as object 506, of a trusted application, which may want to execute in a scheduling context of a second VM 512. In some cases, a trusted application may wait for tasks for processing by establishing and publishing a proxy object, such as object 506, which may refer to an accept queue in the TEE kernel which the trusted application waits on in an accept loop to obtain the next task to process. The proxy object may be used by other trusted applications or VM clients to queue invocation requests to the trusted applications upon the TEE kernel. When the first VM (or another trusted application) has a task for the first trusted application, the first VM (or another trusted application) may invoke the proxy object, such as object 506, of the first trusted application in the TEE kernel to place the task into the first trusted application's accept queue in the kernel. In some cases, the scheduling context switch may be bound to the object of the first trusted application, such that invoking the proxy object, such as object 506, causes the scheduling context switch from the scheduling context of the first VM 504 to the scheduling context of the second VM 512. This VM scheduling context switch binding may be added as a layer in the TEE kernel on top of the scheduler in the TEE kernel that schedules TEE tasks. The kernel may wake the thread of the first trusted application and execute the accept loop of the trusted application in the scheduling context of the second VM. This way, the dispatching of a task to the accept queue of the trusted application triggers the ADCI based change of the scheduling context.

Another scheduling context switch may be bound to a return, wait, exit or other object or function of the trusted application so that returning a result, sleeping, waiting for another task, etc. by the trusted object may trigger another ADCI based change of the scheduling context back to the scheduling context of the first VM 514.

As a second example, a first TEE thread executing in the scheduling context of the first VM 504 may call (e.g., invoke) a service (callback) provided by a second VM. For example, as indicated above, a second VM may register a service object with the TEE, such as object 506, which may be called by the TEE to allow the second VM to perform tasks or provide access to a resource of the second VM. For example, the second VM may register with the TEE, a service object for a TEE service for accessing a file system of the second VM or for accessing a relay protected memory block (RPMB). In some cases, the service object may be similar to the proxy object, discussed above, as the service object may listen for calls from a callback service of the TEE. In some cases, object 502C may invoke (e.g., call) the service object, such as object 506, for example, via the callback service of the TEE, and trigger an ADCI based change of the scheduling context. Thus, rather than switching scheduling contexts when an object (e.g., objects 510) internal to the second VM or a thread of the TEE associated with the second VM are executed, the scheduling context switch may be performed when an invoked object is a service object to access the TEE service which may later execute in part in the scheduling context of the second VM 512. In some cases, ADCI objects for performing the scheduling context switch may be bound to certain global variables or functions made available by the TEE service provided by the second VM to perform the scheduling context switch. Similarly, resources that may be made available by a VM for other VMs to access from the TEE may bound to the ADCI objects for performing the scheduling context switch. By binding access to specific resources to performing the scheduling context switch, access to those resources may be performed based on the VM which owns the resource and the TEE service may execute in the scheduling context of the VM which owns the resource. As a more detailed example, if object 506 includes a reference to a global variable that is made available by the second VM, when object 506 is called, the scheduling context switch may be performed from the scheduling context of the first VM 504 to the scheduling context of the second VM 512. As discussed above, the VM scheduling context switch binding may be added as a layer in the kernel on top of the scheduler in the kernel that schedules TEE tasks so that ADCI may be used at the boundaries (e.g., invocation) of a service object (e.g., objects 506 and 508) which may execute in a different scheduling context.

Additionally, by binding access to specific resources to the scheduling context switch, when those specific resources are released, another scheduling context switch back to the scheduling context of the calling VM (e.g., the first VM scheduling context 514) may be performed. For example, when unwinding the call into the service object, such as object 506, a call to an object, such as object 508 may return a result, sleep, wait for another invocation, etc. by the TEE service. In some cases, the returned result may be returned value for the service object (e.g., object 506 and 508 may be the same object). In this way, all global or shared resources acquired by the TEE service whose execution boundaries are defined by objects 506 and 508 can be enclosed in the same scheduling context, and the TEE service itself can provide that the release of all of the global or shared resources may be controlled by the TEE service itself, thereby preventing a change of scheduling context occurring inside the execution of the service from causing those resources to become unavailable to other TEE services or trusted applications when later scheduled by other VMs.

FIG. 6 is a flow diagram illustrating an example of a process 600 for data access, in accordance with aspects of the present disclosure. The process 600 may be performed by a computing device (or apparatus) (e.g., computing system 700 of FIG. 7) or a component (e.g., a chipset, codec, TEE 315 of FIG. 3, processor 710 of FIG. 7, a TEE of processor 710, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 600 may be implemented as software components that are executed and run on one or more processors.

At block 602, the computing device (or component thereof) may call, by (or using) a first object (e.g., object 502C of FIG. 5), a second object (e.g., object 506 of FIG. 5). In some cases, the first object is associated with a first virtual machine (VM) (e.g., HLOS VM 150, VM 160, VM 170 of FIG. 1A, HLOS VM 250, VM 260, VM 270 of FIG. 2, VM1 360 of FIG. 3, VM1 410 of FIG. 4, VM1 504 of FIG. 5, etc.) of a plurality of VMs and is executing in a scheduling context of the first VM (e.g., first TEE thread 440 of FIG. 4). In some cases, the second object is registered with a trusted execution environment (TEE) (e.g., TEE 315 of FIG. 3) and is associated with a second VM (e.g., HLOS VM 150, VM 160, VM 170 of FIG. 1A, HLOS VM 250, VM 260, VM 270 of FIG. 2, VM2 370 of FIG. 3, VM2 420 of FIG. 4, VM2 512 of FIG. 5, etc.) of the plurality of VMs. In some cases, the second object includes a proxy object. In some aspects, the code includes a function of a trusted application executing in the TEE. In some cases, the trusted application invokes a resource of the second VM. In some examples, the second object includes a service object provided to the TEE by the second VM. In some cases, the code includes a function of a service executing on the second VM. In some aspects, the computing device (or component thereof) may register the second object with an arbitrary destination callback invocation (ADCI) service of the TEE. In some cases, the plurality of VMs and the TEE are executed on the computing device (or component thereof).

At block 604, the computing device (or component thereof) may receive, by the second object, a call (e.g., operation 464 of FIG. 4) from the first object.

At block 606, the computing device (or component thereof) may switch the scheduling context to the scheduling context of the second VM (e.g., second TEE thread 450 of FIG. 4) based on the received call from the first object. In some cases, switching the scheduling context is bound to the call from the first object. In some examples, a scheduler for the TEE switches the scheduling context based on the bounded call from the first object.

At block 608, the computing device (or component thereof) may execute code associated with the second object in the scheduling context of the second VM. In some cases, the computing device (or component thereof) may return a result of the executed code associated with the second object; and switch the scheduling context to the scheduling context of the first VM based on returning the result.

The components of a device configured to perform the process 600 of FIG. 6 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
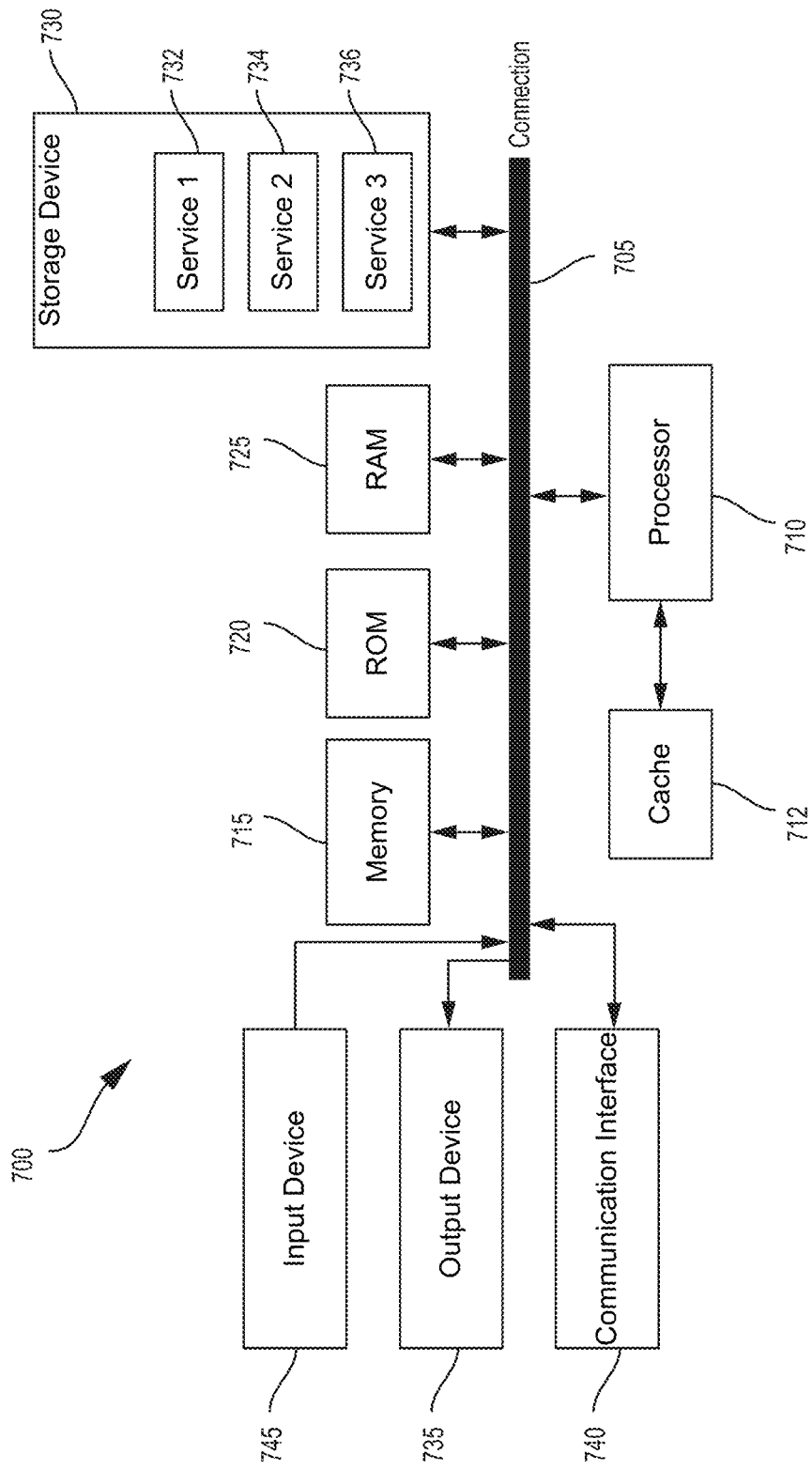
FIG. 7 is a block diagram illustrating an example of a computing system, which may be employed by the disclosed systems and techniques, in accordance with some examples.

FIG. 7 is a block diagram illustrating an example of a computing system 700, which may be employed by the disclosed systems and techniques. In particular, FIG. 7 illustrates an example of computing system 700, which can be, for example, any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some aspects, computing system 700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 700 includes at least one processing unit (CPU or processor) 710 and connection 705 that communicatively couples various system components including system memory 715, such as read-only memory (ROM) 720 and random-access memory (RAM) 725 to processor 710. Computing system 700 can include a cache 712 of high-speed memory connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric. The processor 710 may include a TEE. In cases where processor 710 includes multiple cores or processors, each core or processor may include a TEE.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700.

Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 740 may also include one or more range sensors (e.g., LIDAR sensors, laser range finders, RF radars, ultrasonic sensors, and infrared (IR) sensors) configured to collect data and provide measurements to processor 710, whereby processor 710 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some aspects, a hardware service that performs a particular function can include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for accessing execution environments, the method comprising: calling, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receiving, by the second object, a call from the first object; switching the scheduling context to the scheduling context of the second VM based on the received call from the first object; and executing code associated with the second object in the scheduling context of the second VM.

Aspect 2. The method of Aspect 1, further comprising: returning a result of the executed code associated with the second object; and switching the scheduling context to the scheduling context of the first VM based on returning the result.

Aspect 3. The method of any of Aspects 1-2, wherein the second object comprises a proxy object, and wherein the code comprises a function of a trusted application executing in the TEE.

Aspect 4. The method of Aspect 3, wherein the trusted application invokes a resource of the second VM.

Aspect 5. The method of any of Aspects 1-4, wherein the second object comprises a service object provided to the TEE by the second VM, and wherein the code comprises a function of a service executing on the second VM.

Aspect 6. The method of any of Aspects 1-5, wherein switching the scheduling context is bound to the call from the first object.

Aspect 7. The method of Aspect 6, wherein a scheduler for the TEE switches the scheduling context based on the bounded call from the first object.

Aspect 8. The method of any of Aspects 1-7, further comprising registering the second object with an arbitrary destination callback invocation (ADCI) service of the TEE.

Aspect 9. The method of any of Aspects 1-8, wherein the plurality of VMs and the TEE are executed on a same computing device.

Aspect 10. An apparatus for accessing execution environments, the apparatus comprising: at least one memory; and at least one processor coupled to the at least one memory and configured to: call, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receive, by the second object, a call from the first object; switch the scheduling context to the scheduling context of the second VM based on the received call from the first object; and execute code associated with the second object in the scheduling context of the second VM.

Aspect 11. The apparatus of Aspect 10, wherein the at least one processor is further configured to: return a result of the executed code associated with the second object; and switch the scheduling context to the scheduling context of the first VM based on returning the result.

Aspect 12. The apparatus of any of Aspects 10-11, wherein the second object comprises a proxy object, and wherein the code comprises a function of a trusted application executing in the TEE.

Aspect 13. The apparatus of Aspect 12, wherein the trusted application invokes a resource of the second VM.

Aspect 14. The apparatus of any of Aspects 10-13, wherein the second object comprises a service object provided to the TEE by the second VM, and wherein the code comprises a function of a service executing on the second VM.

Aspect 15. The apparatus of any of Aspects 10-14, wherein switching the scheduling context is bound to the call from the first object.

Aspect 16. The apparatus of Aspect 15, wherein a scheduler for the TEE switches the scheduling context based on the bounded call from the first object.

Aspect 17. The apparatus of any of Aspects 10-16, wherein the at least one processor is further configured to register the second object with an arbitrary destination callback invocation (ADCI) service of the TEE.

Aspect 18. The apparatus of any of Aspects 10-17, wherein the plurality of VMs and the TEE are executed on the apparatus.

Aspect 19. A non-transitory computer-readable medium having stored thereon instructions that, when executed by at least one processor, cause the at least one processor to: call, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; receive, by the second object, a call from the first object; switch the scheduling context to the scheduling context of the second VM based on the received call from the first object; and execute code associated with the second object in the scheduling context of the second VM.

Aspect 20. The non-transitory computer-readable medium of Aspect 19, wherein the instructions further cause the at least one processor to: return a result of the executed code associated with the second object; and switch the scheduling context to the scheduling context of the first VM based on returning the result.

Aspect 21. The non-transitory computer-readable medium of any of Aspects 19-20, wherein the second object comprises a proxy object, and wherein the code comprises a function of a trusted application executing in the TEE.

Aspect 22. The non-transitory computer-readable medium of Aspect 21, wherein the trusted application invokes a resource of the second VM.

Aspect 23. The non-transitory computer-readable medium of any of Aspects 19-22, wherein the second object comprises a service object provided to the TEE by the second VM, and wherein the code comprises a function of a service executing on the second VM.

Aspect 24. The non-transitory computer-readable medium of any of Aspects 19-23, wherein switching the scheduling context is bound to the call from the first object.

Aspect 25. The non-transitory computer-readable medium of Aspect 24, wherein a scheduler for the TEE switches the scheduling context based on the bounded call from the first object.

Aspect 26. The non-transitory computer-readable medium of any of Aspects 19-25, wherein the instructions further cause the at least one processor to register the second object with an arbitrary destination callback invocation (ADCI) service of the TEE.

Aspect 27. The non-transitory computer-readable medium of any of Aspects 19-26, wherein the plurality of VMs and the TEE are executed on a same computing device.

Aspect 28. An apparatus for accessing execution environments, the apparatus comprising: means for calling, by a first object, a second object, wherein the first object is associated with a first virtual machine (VM) of a plurality of VMs, wherein the first object is executing in a scheduling context of the first VM, wherein the second object is registered with a trusted execution environment (TEE), and wherein the second object is associated with a second VM of the plurality of VMs; means for receiving, by the second object, a call from the first object; means for switching the scheduling context to the scheduling context of the second VM based on the received call from the first object; and means for executing code associated with the second object in the scheduling context of the second VM.

Aspect 29. The apparatus of Aspect 28, the apparatus further comprising: means for returning a result of the executed code associated with the second object; and means for switching the scheduling context to the scheduling context of the first VM based on returning the result.

Aspect 30. The apparatus of any of Aspects 28-29, wherein the second object comprises a proxy object, and wherein the code comprises a function of a trusted application executing in the TEE.

Aspect 31. An apparatus comprising one or more means for performing operations according to any of Aspects 1 to 9.

What is claimed is:

1. A method for accessing execution environments, the method comprising:
    calling, by a first object, a second object, wherein the first object is associated with a first virtual machine (VM) of a plurality of VMs, wherein the first object is executing in a scheduling context of the first VM, wherein the second object is registered with a trusted execution environment (TEE), wherein the scheduling context of the first VM is allocated by a scheduler of the TEE, and wherein the second object is associated with a second VM of the plurality of VMs;
    switching, by the scheduler, the scheduling context of the TEE to the scheduling context of the second VM based on a received call from the first object; and
    executing code associated with the second object in the TEE in the scheduling context of the second VM, wherein the scheduling context of the second VM is allocated by the scheduler.

2. The method of claim 1, further comprising:
    returning a result of the executed code associated with the second object; and
    switching the scheduling context to the scheduling context of the first VM based on returning the result.

3. The method of claim 1, wherein the second object comprises a proxy object, and wherein the code comprises a function of a trusted application executing in the TEE.

4. The method of claim 3, wherein the trusted application invokes a resource of the second VM.

5. The method of claim 1, wherein the second object comprises a service object provided to the TEE by the second VM, and wherein the code comprises a function of a service executing on the second VM.

6. The method of claim 1, wherein switching the scheduling context is bound to the call from the first object.

7. The method of claim 6, wherein a scheduler for the TEE switches the scheduling context based on the bounded call from the first object.

8. The method of claim 6, wherein a context switch binding is added as a layer on the scheduler.

9. The method of claim 1, further comprising registering the second object with an arbitrary destination callback invocation (ADCI) service of the TEE.

10. The method of claim 1, wherein the plurality of VMs and the TEE are executed on a same computing device.

11. An apparatus for accessing execution environments, the apparatus comprising:
    at least one memory; and
    at least one processor coupled to the at least one memory and configured to:
        call, by a first object, a second object, wherein the first object is associated with a first virtual machine (VM) of a plurality of VMs, wherein the first object is executing in a scheduling context of the first VM, wherein the second object is registered with a trusted execution environment (TEE), wherein the scheduling context of the first VM is allocated by a scheduler of the TEE, and wherein the second object is associated with a second VM of the plurality of VMs;
        switch, the scheduler, the scheduling context of the TEE to the scheduling context of the second VM based on a received call from the first object; and
        execute code associated with the second object in the scheduling context of the second VM, wherein the scheduling context of the second VM is allocated by the scheduler.

12. The apparatus of claim 11, wherein the at least one processor is further configured to:
    return a result of the executed code associated with the second object; and
    switch the scheduling context to the scheduling context of the first VM based on returning the result.

13. The apparatus of claim 11, wherein the second object comprises a proxy object, and wherein the code comprises a function of a trusted application executing in the TEE.

14. The apparatus of claim 13, wherein the trusted application invokes a resource of the second VM.

15. The apparatus of claim 11, wherein the second object comprises a service object provided to the TEE by the second VM, and wherein the code comprises a function of a service executing on the second VM.

16. The apparatus of claim 11, wherein switching the scheduling context is bound to the call from the first object.

17. The apparatus of claim 16, wherein a scheduler for the TEE switches the scheduling context based on the bounded call from the first object.

18. The apparatus of claim 11, wherein the at least one processor is further configured to register the second object with an arbitrary destination callback invocation (ADCI) service of the TEE.

19. The apparatus of claim 11, wherein the plurality of VMs and the TEE are executed on the apparatus.

20. A non-transitory computer-readable medium having stored thereon instructions that, when executed by at least one processor, cause the at least one processor to:
    call, by a first object, a second object, wherein the first object is associated with a first virtual machine (VM) of a plurality of VMs, wherein the first object is executing in a scheduling context of the first VM, wherein the second object is registered with a trusted execution environment (TEE), wherein the scheduling context of the first VM is allocated by a scheduler of the TEE, and wherein the second object is associated with a second VM of the plurality of VMs;
    switch, by the scheduler, the scheduling context of the TEE to the scheduling context of the second VM based on a received call from the first object; and
    execute code associated with the second object in the scheduling context of the second VM, wherein the scheduling context of the second VM is allocated by the scheduler.

21. The non-transitory computer-readable medium of claim 20, wherein the instructions further cause the at least one processor to:
    return a result of the executed code associated with the second object; and
    switch the scheduling context to the scheduling context of the first VM based on returning the result.

22. The non-transitory computer-readable medium of claim 20, wherein the second object comprises a proxy object, and wherein the code comprises a function of a trusted application executing in the TEE.

23. The non-transitory computer-readable medium of claim 22, wherein the trusted application invokes a resource of the second VM.

24. The non-transitory computer-readable medium of claim 20, wherein the second object comprises a service object provided to the TEE by the second VM, and wherein the code comprises a function of a service executing on the second VM.

25. The non-transitory computer-readable medium of claim 20, wherein switching the scheduling context is bound to the call from the first object.

26. The non-transitory computer-readable medium of claim 25, wherein a scheduler for the TEE switches the scheduling context based on the bounded call from the first object.

27. The non-transitory computer-readable medium of claim 20, wherein the instructions further cause the at least one processor to register the second object with an arbitrary destination callback invocation (ADCI) service of the TEE.

28. The non-transitory computer-readable medium of claim 20, wherein the plurality of VMs and the TEE are executed on a same computing device.

* * * * *